United States Patent [19]

Weber

[11] Patent Number: 4,752,058
[45] Date of Patent: Jun. 21, 1988

[54] SHOCK-ABSORBING SUPPORT RAIL

[76] Inventor: Milton N. Weber, P.O. Box 2533, Dearborn, Mich. 48123

[21] Appl. No.: 937,698

[22] Filed: Dec. 4, 1986

[51] Int. Cl.$^4$ .............................................. F16M 13/00
[52] U.S. Cl. ................................... 248/638; 248/615
[58] Field of Search ..................... 248/634, 345.1, 638, 248/615; 410/117, 87, 88; 267/141.6, 153; 220/1.5, 85 K; 206/460

[56] References Cited

U.S. PATENT DOCUMENTS

| | | | |
|---|---|---|---|
| 2,774,502 | 12/1956 | Novak | 220/85 K X |
| 3,028,981 | 4/1962 | Ford et al. | 410/117 |
| 3,963,226 | 6/1976 | Jankowski | 220/85 K X |
| 3,975,564 | 8/1976 | Jones | 248/345.1 X |
| 4,372,458 | 2/1983 | Carlson | 220/85 K X |
| 4,469,303 | 9/1984 | Snyder | 248/634 |
| 4,582,739 | 4/1986 | Givens | 248/345.1 X |
| 4,674,433 | 4/1954 | Mautner | 267/141.6 |

FOREIGN PATENT DOCUMENTS 3446831 4/1986 Fed. Rep. of Germany ...... 248/634

Primary Examiner—J. Franklin Foss

[57] ABSTRACT

A shock absorber support rail is formed of an elongated, stiff, but springy, plastic extruded strip that is M-shaped in cross-section. The M-shape is turned on its side and its legs are substantially parallel. The converging legs of the V-shaped center portion of the M-shape form a central, acute angle apex where they join and they form upper and lower apices at their junctures with the parallel legs. The converging legs are bent to form integral leg parts that are angled at different acute angles relative to the axis of the M-shape, so that the spring rate may be varied during compression of the parallel towards each other. The strip has the same spring rates per unit length along the full length of the strip. Thus, pieces of predetermined length may be cut off the strip to form separate support rails, each of a predetermined spring strength dependent upon its particular length. A number of rails of required strength, that is, of predetermined lengths, may be positioned between an article to be supported and a support surface for absorbing shock loads and vibrations transmitted therebetween.

12 Claims, 1 Drawing Sheet

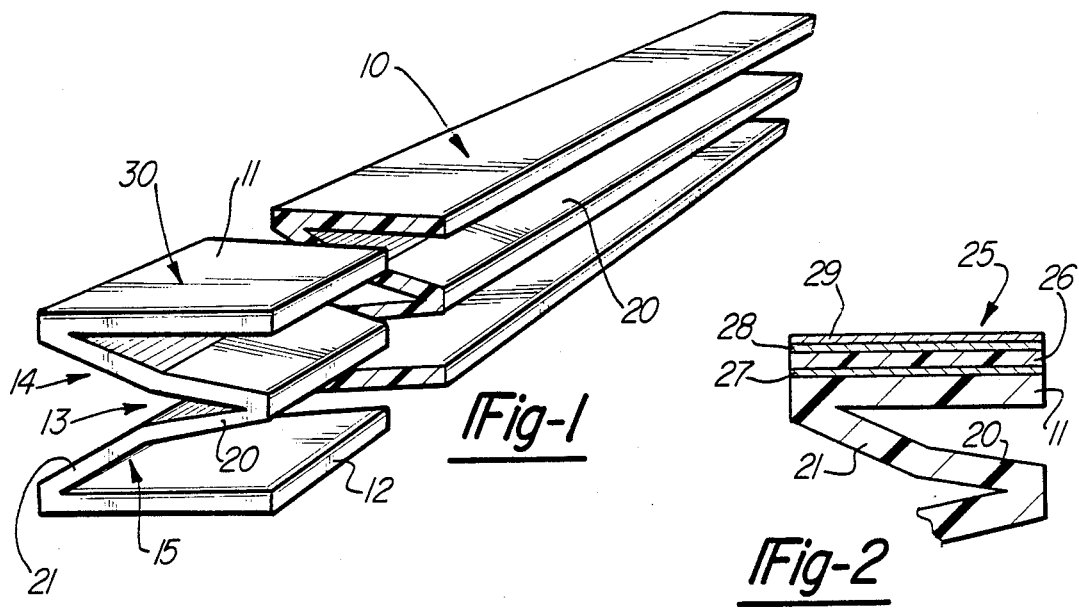
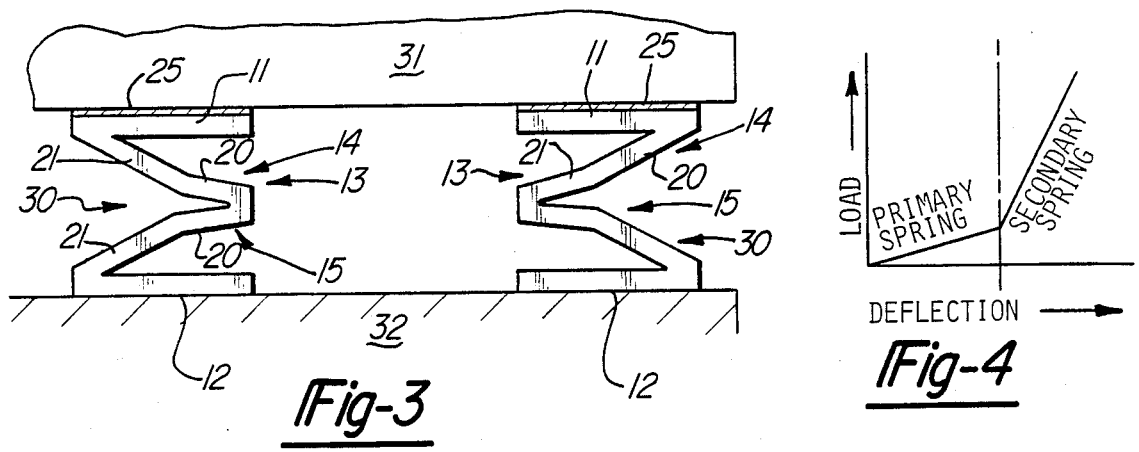
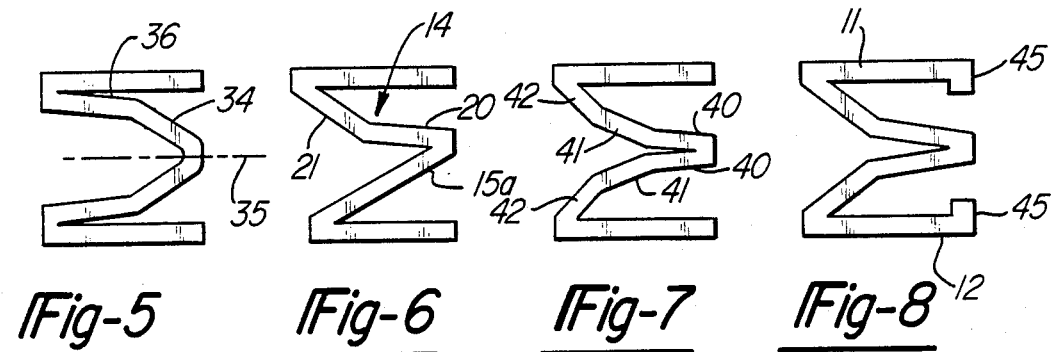

SHOCK-ABSORBING SUPPORT RAIL

BACKGROUND OF THE INVENTION

This invention relates to springs for positioning between an article to be supported and a support surface for absorbing shock loads and vibrations which otherwise would be transmitted therebetween. The spring of this invention is particularly useful in the transportation of relatively large, heavy items in trucks, railroad cars and the like where considerable shock loads and vibrations are encountered which tend to damage the articles.

By way of example, in the shipment of industrial parts, such as automotive parts, engines, and the like, it is common to ship parts either separately supported upon pallets or, at times, within tote boxes or similar large containers. These parts may be shipped from one manufacturing plant to another and the shipment typically takes place in truck trailers, railroad cars or upon conveyors or the like. During the movement of the parts, whether individually mounted upon pallets or collectively supported within containers, the parts are susceptible to damage caused by the shock loads and vibrations encountered in transit.

To reduce transit-induced damage, attempts have been made to provide springs or other cushioning types of supports for the articles, including sometimes packaging the articles within shock-absorbing materials, such as pieces of foam plastic arranged within a container, etc. In many types of shipments, it is desirable to be able to quickly position an inexpensive springy support beneath the article or beneath its container or pallet to support the load and to protect against anticipated shocks and vibrations. Since the weight of particular shipments may vary, there is a need for a spring which can be varied in spring strength, but which is sufficiently inexpensive so that it can be discarded after a single use. Thus, the invention herein relates to an improved spring or springy support rail which can be hand-tailored to provide the needed spring support for a particular weight shipment or article to be protected.

SUMMARY OF INVENTION

The invention herein contemplates forming a spring out of an elongated, uniform cross-section, extruded plastic strip made of a stiff, but springy plastic material. The strip is extruded a generally block M-shape cross-section and is turned on its side so that the parallel legs of the M-shape are located one above the other and the V-shape central part of the M-shape is arranged along a generally horizontal axis. Thus, the upper leg of the M is compressible downwardly towards the lower leg against the springy resistance due to the V-shape center part.

The invention contemplates bending one or both of the converging legs, which make up the V-shape central part, into at least two separate, integrally joined leg sections which are arranged at different acute angles relative to the axis of the V-shape. Thus, the converging leg sections form primary and secondary springs between the parallel upper and lower M-shape outer legs.

By selecting a suitable size and wall thickness to produce a predetermined springiness, the strips provide a uniform springiness per unit length along their full lengths. Hence, pieces of preselected lengths may be cut off the elongated strip and each piece will have a springiness or spring strength corresponding to its own length. Consequently, the spring strength of each piece can be varied simply by varying its length. These pieces form rails which can be manually arranged beneath an article to be supported, as for example, a separate rail can be arranged at each corner area of a shipping container or along each side of a container, etc.

Since the rail is formed of a predetermined length cut off a uniform cross-section strip of considerable length, the amount of spring support than may be required for a particular article can be determined by trial and error or may be calculated. Thereafter, preselected length rails can be cut off the long strips to obtain the number of units of length needed to yield that required support.

Significantly, the strips are formed of relatively inexpensive extrusions so that they may be treated as single use, throw-away items. By way of example, the rails may be fastened to the bottom surface of a paperboard shipping container or the like, such as by the use of an adhesive or a double-faced adhesive tape, and can be discarded with the shipping container after delivery. As another example, if an article itself is to be directly supported upon the floor of a trailer or truck, the rail pieces may be adhesively secured to the bottom of the article, e.g. by adhesive, and may be pulled off the bottom of the article after delivery.

It is a principal object of this invention to provide an extremely inexpensive shock-absorbing spring which can be adjusted in spring strength merely by varying its length. Its length is varied merely by cutting more or less off a longer strip which has a uniform spring strength per unit length. Thus, different spring force supports may be provided, as required, and these supports may be thrown away upon completion of their use.

A further object of this invention is to provide a variable strength spring support which also has a spring resistance that changes in reponse to the amount of compression. That is, by pre-bending or varying the angles of different sections along the converging legs that form the V-shape center section of the M-shape cross-section rail, different spring effects can be obtained. For example, a relatively soft spring can be provided which after a certain amount of compression will become stiffer in spring resistance.

These and other objects and advantages of this invention will become apparent upon reading the following description, of which the attached drawings form a part.

DESCRIPTION OF DRAWINGS

FIG. 1 is a perspective view of a long, extruded spring strip, with a short section cut off to form a separate spring rail.

FIG. 2 is an enlarged, cross-sectional view showing, schematically, the use of an adhesive tape for securing an article upon the rail.

FIG. 3 is an enlarged, fragmentary end view schematically showing a pair of springy rails supporting an article upon a support surface.

FIG. 4 is a simplified graph illustrating primary and secondary spring effects obtained by varying the angles of sections of the converging legs which form the V-shaped central part of the rail.

FIGS. 5–8 each illustrate an end view of a modified cross-sectional shape of the strip.

DETAILED DESCRIPTION

FIG. 1 illustrates an elongated, M-shaped in cross-section, extruded plastic strip 10. The M-shape is turned on its side to provide parallel upper leg 11 and lower leg 12. Integral with the parallel legs is the V-shaped section 13 made up of converging legs 14 and 15. The juncture between the upper leg 11 and converging leg 14 forms an upper apex 16. Similarly, the juncture between the lower leg 12 and converging leg 15 forms a lower apex 17. The two converging legs provide a central apex 18 for the V-shaped portion.

The two converging legs 14 and 15 are bent, roughly at their middle points, into inner and outer sections or spring parts 20 and 21. The inner spring parts 20 of the legs are arranged at a much sharper acute angle, relative to the central axis of the V-shape, than the integral, outer spring parts 21. Thus, the inner spring parts 20 form a primary spring arrangement while the outer parts form secondary spring arrangements.

One or both of the parallel legs 11 and 12 may be provided with an adhesive coating for fastening to an article to be supported by the strip. The adhesive coating 25 may be formed of a double-faced adhesive tape 25 (see FIG. 2) which comprises a foam plastic strip 26, a lower adhesive 25 layer attaching the foam strip to the parallel leg 11, and an upper adhesive layer 28 which is covered by a removable cover strip or sheet 29. The cover sheet 29 can be removed manually, when it is desired to apply the device to the bottom of an article to be supported or upon the upper surface of a support surface.

In use, the elongated strip is cut into short pieces to form spring rails 30 (see FIG. 1). These rails may be positioned beneath a supported article 31, as for an example, a container within which goods to be transmitted are contained. The rails may be positioned at the corners of the container, or may run in long rail lengths adjacent the sides of the container, etc. The rails are rested upon a support surface 32, as for example, the bed of a truck or the floor of a trailer or railroad car or the like. Thus, the rails 30 act as springs beneath the article to be supported.

The cross-sectional size of the M-shape extrusion and the wall thickness of the legs are determined by calculating the general amount of spring strength desired per unit length, e.g. the amount of spring resistance per lineal inch of the strip. Thus, the size and wall thicknesses may vary considerably, depending upon the springiness and strength of the particular plastic material selected, the anticipated shock loads, vibrations, etc. Since the spring strength or spring break rate is uniform for each unit length throughout the entire length of each strip, the actual user may merely slice off pieces of preselected length to obtain a piece of the desired spring strength. Alternatively, separated rails of particular spring strengths may be manufactured, for later supply to users, by slicing predetermined length pieces off long strips. In operation, since the springiness of each piece is determined by its length, the user may determine the load of a particular shipment and then, he may cut rails of preselected lengths to provide that strength to handle the anticipated load.

The strips may be made of any suitable, commercially available plastic which is extrudable and has sufficient strength, durability, and springiness for the purpose. One available plastic which is useful for this intended purpose is an acetal copolymer, marketed under the trademark of "Celcon" by the Celanese Corporation, and identified as "Celcon TX-90". This is a ductile material having considerable impact strength.

The cross-sectional shape of the converging legs 14 and 15 produce two different spring rates, as illustrated schematically in the diagram shown in FIG. 4. There, for inner parts 20 of the legs provide a primary spring support which deflects at a given rate upon the application of a load. A substantial increase in the load, such as a suddenly applied heavier shock, results in sufficient compression to cause a secondary, considerably greater, spring resistance. This results in less deflection proportionally to the load and thus a stiffer spring. Different spring effects can be obtained by changing the acute angles of the apices at the intersections between parallel legs and the converging legs, and the angles of the converging leg sections and the apex angle of the converging legs. This also provides a dual spring rate device.

The modifications illustrated in FIGS. 5-7 show different leg angles to vary the spring rates and spring resistances. For example, in FIG. 5, the inner leg sections 34 are at a greater acute angle, relative to the central axis 35, than the outer leg sections 36.

FIG. 6 illustrates a modification wherein the upper, converging leg 14 is formed with the same two sections 20 and 21 as shown in FIG. 3, but the lower leg 15a is unbent or straight. This can be reversed.

The modification in FIG. 7 shows the converging legs each bent twice to provide three separate springy sections 40, 41 and 42 which results in a three-part spring rate.

FIG. 8 illustrates a rail similar to that shown in FIG. 3, but includes stop in the form of short flanges 45 formed on the free ends of the parallel legs 11 and 12. These stops limit the bottoming-out point when the device is fully compressed and, therefore, protect the device against crushing.

It can be seen that by utilizing a preselected cross-sectional shape strip which provides preselected spring rates which are uniform per unit length, different length pieces may be used to provide the required support and shock and vibration protection.

This invention may be further developed within the scope of the following claims, of which the foregoing disclosure is illustrative.

What is claimed is:

1. A shock-absorbing support rail, comprising:
an elongated extruded strip having substantially parallel longitudinal load bearing surfaces extending along an axial length of the strip;
the strip being of uniform cross-section having generally an M-shape including a pair of substantially parallel outer legs projecting along the axial length as the load bearing surfaces, and a pair of inner legs interconnecting the outer legs, and converging to form an apex of a center part having a generally V-shape with a central acute angle; and
the strip being made of a plastic material having a relative stiffness and springiness to generally maintain the V-shape center part with the central acute angle so that, when the strip is between an angle to be supported and a support surface, with one load bearing surface against the article and the other load bearing surface against the support surface, the V-shaped center part absorbs vibrations and shock loads which may be transmitted between the article and the support surface.

2. A construction as defined in claim 1, wherein the M-shaped cross-section is of a predetermined size and wall thickness to produce a predetermined uniform spring rate per unit length along the axial length of the strip.

3. A construction as defined in claim 2, wherein the strip is transversely severable into separate pieces of preselected lengths to provide separate pieces, each piece being of a predetermined springiness based upon the preselected length of each piece.

4. A construction as defined in claim 1, wherein at least one of the inner legs being bent between its opposite ends to form end-to-end integrally joined, adjacent leg parts that are each arranged at a different angle than its adjacent part relative to the axis of the strip to provide primary and secondary spring portions.

5. A construction as defined in claim 4, wherein the leg part whose end forms the apex of the V-shape being arranged at a considerably lesser acute angle relative to the central axis of the V-shape than its adjacent integral leg part.

6. A construction as defined in claim 5, wherein the leg part whose end forms the apex of the V-shape being arranged at a considerably greater acute angle relative to the central axis of the V-shape than its adjacent integral leg part.

7. A construction as defined in claim 4, wherein each of the two inner legs being bent into end-to-end, integrally joined parts that are each arranged at a different angle than its adjacent part relative to the central axis of the V-shaped center part.

8. A construction as defined in claims 6, wherein the leg parts whose ends form the center apex of the V-shaped center part being arranged at a considerably lesser acute angle relative to the central axis of the V-shaped part than their adjacent integral leg parts.

9. A construction as defined in claim 1, wherein at least one of the converging inner legs being sharply bent, generally near its middle, to form two end-to-end, integrally joined adjacent leg parts that are each arranged at a different angle than its adjacent leg part relative to the central axis of the V-shaped center part.

10. A construction as defined in claim 9, wherein the converging leg parts which together form the apex of the V-shaped center part being arranged at a considerably sharper, acute angle relative to the central axis of the V-shaped part than their adjacent, integral parts which each form an apex with their adjacent parallel outer leg.

11. A construction as defined in claim 1, wherein a free end of each of the parallel outer legs having an inwardly-extending flange portion forming a stop for limiting the movement of the parallel outer legs towards each other upon compression thereof.

12. A construction as defined in claim 4, wherein the parts of the inner legs which form the apex of the V-shaped center part being at a sharper acute angle relative to the axis of the V-shaped part than the parts of the inner legs which are integral with the outer legs, so that the sharper angle portions form the primary spring section and the other parts of the legs form the secondary spring portion.

* * * * *

UNITED STATES PATENT AND TRADEMARK OFFICE
CERTIFICATE OF CORRECTION

PATENT NO. : 4,752,058

DATED : June 21, 1988

INVENTOR(S) : Milton N. Weber

It is certified that error appears in the above-identified patent and that said Letters Patent is hereby corrected as shown below:

Claim 1, line 15, change "angle" (second occurrence) to --article--.

Signed and Sealed this

Twenty-ninth Day of November, 1988

Attest:

DONALD J. QUIGG

Attesting Officer

Commissioner of Patents and Trademarks